(12) United States Patent
Kasano et al.

(10) Patent No.: US 8,576,664 B2
(45) Date of Patent: Nov. 5, 2013

(54) MOVING OBJECT DETECTION SYSTEM

(75) Inventors: Fumihiro Kasano, Katano (JP); Toshimasa Takagi, Kobe (JP); Hidehiko Fujikawa, Toyota (JP); Toru Mugiuda, Minoh (JP)

(73) Assignee: Panasonic Corporation, Kadoma-shi (JP)

( * ) Notice: Subject to any disclaimer, the term of this patent is extended or adjusted under 35 U.S.C. 154(b) by 865 days.

(21) Appl. No.: 12/312,608

(22) PCT Filed: Mar. 15, 2007

(86) PCT No.: PCT/JP2007/055215
§ 371 (c)(1),
(2), (4) Date: May 19, 2009

(87) PCT Pub. No.: WO2008/062568
PCT Pub. Date: May 29, 2008

(65) Prior Publication Data
US 2010/0052972 A1    Mar. 4, 2010

(30) Foreign Application Priority Data

Nov. 20, 2006  (JP) .................................. 2006-313397
Dec. 8, 2006   (JP) .................................. 2006-332432
Dec. 8, 2006   (JP) .................................. 2006-332436

(51) Int. Cl.
*G01S 15/00*   (2006.01)
*G08B 13/18*   (2006.01)
*G08G 1/01*    (2006.01)

(52) U.S. Cl.
USPC ............... 367/94; 367/95; 340/554; 340/933; 340/943; 342/27; 342/28; 342/99

(58) Field of Classification Search
USPC ......... 367/94, 95; 340/554, 933, 943; 342/27, 342/28, 99
See application file for complete search history.

(56) References Cited

U.S. PATENT DOCUMENTS 3,942,178 A   3/1976  Hackett
4,287,579 A   9/1981  Inoue et al.
(Continued)

FOREIGN PATENT DOCUMENTS

JP    57-91478 A    6/1982
JP    62-043507     9/1987
(Continued)

OTHER PUBLICATIONS

International Search Report and Written Opinion mailed May 29, 2007, issued in PCT/JP2007/055215.
(Continued)

*Primary Examiner* — Donnie L Crosland
(74) *Attorney, Agent, or Firm* — Edwards Wildman Palmer LLP

(57) ABSTRACT

A moving object detection system is provided with an existence detection part, an integrating part and an existence judgment part. Based on first and second detection signals, the existence detection part calculates a rotation angle of each transition factor that is obtained from the first and second detection signals and rotates around the origin in a two-dimensional coordinate system. The existence detection part is configured so that the rotation angle becomes less than 90 degrees. The integrating part integrates each rotation angle to obtain an integrated angle. The existence judgment part judges whether or not a moving object approaching or leaving a receiver of the device exists in a detection area based on the integrated angle and a threshold angle.

17 Claims, 11 Drawing Sheets

(56) References Cited

U.S. PATENT DOCUMENTS

| | | | |
|---|---|---|---|
| 4,961,039 A | 10/1990 | Yamauchi et al. | |
| 5,808,544 A | 9/1998 | Kani et al. | |
| 5,856,778 A | 1/1999 | Kani et al. | |

FOREIGN PATENT DOCUMENTS

| | | |
|---|---|---|
| JP | 1-189582 | 7/1989 |
| JP | 1-287491 A | 11/1989 |
| JP | 2-223885 A | 9/1990 |
| JP | 6-075044 | 3/1994 |
| JP | 61-93970 A | 7/1994 |
| JP | 6-222140 | 8/1994 |
| JP | 6-222141 A | 8/1994 |
| JP | 9-272402 | 10/1997 |
| JP | 2000-187074 A | 7/2000 |
| JP | 2002-168946 A | 6/2002 |
| JP | 2003-002196 A | 1/2003 |
| JP | 2004-361355 | 12/2004 |

OTHER PUBLICATIONS

Supplementary European Search Report dated Aug. 31, 2011, issued for the European patent application No. 07738665.4.
Notification of Reasons for Refusal for JP-2006-332432 (dated Jul. 5, 2011) and Abstract.
Notification of Reasons for Refusal for JP-2006-332436 (dated Jul. 5, 2011) and Abstract.

MOVING OBJECT DETECTION SYSTEM

TECHNICAL FIELD

The invention relates to moving object detection systems and, more particularly, to a moving object detection system for detecting, for example, approach of one or more moving objects within a specified distance in a detection area.

BACKGROUND ART

This sort of moving object detection system is used as, for example, a security system or the like. For example, Japanese Patent Application Publication No. H09-272402 published on Oct. 21, 1997 discloses an ultrasonic Doppler type intrusion detection system for vehicle (hereinafter also referred to as a "first prior system"). This system detects human intrusion into a vehicle based on a phase difference between an output signal for generating ultrasonic waves and an input signal obtained from incoming ultrasonic waves. Concretely, if a Doppler shift period obtained from the phase difference is within a prescribed period range, human intrusion into a vehicle is detected.

Japanese Patent Publication No. S62-43507 published on Sep. 14, 1987 discloses a moving object detection system (hereinafter also referred to as a "second prior system"). This system is configured: to extract cosine and sine component signals from an output signal for generating ultrasonic waves and an input signal obtained from incoming ultrasonic waves; and to convert the cosine and sine component signals into binary signals to set to X and Y values of an X-Y coordinate system, respectively. An X value is 1 or 0 and a Y value is also 1 or 0, and accordingly a coordinate point (X, Y) corresponds to any quadrant of the coordinate system. The system judges that a moving object approaching the system exists in a detection area if (X, Y) turns counterclockwise around the origin of the coordinate system, and judges that a moving object leaving the system exists in a detection area if (X, Y) turns clockwise. In this prior art, existence of a moving object can be certainly detected without frequency analysis.

Japanese Patent Application Publication No. H01-189582 published on Jul. 28, 1989 discloses a moving object detection system (hereinafter also referred to as a "third prior system"). This system judges whether or not a moving object approaching or leaving an ultrasonic receiver exists in a detection area based on two Doppler signals in the same way as the second prior system. The system then increases a count value for an alarm in response to the existence of the moving object approaching the receiver, and decreases the count value in response to the existence of the moving object leaving the receiver. In this system, the influence caused by the swing of a curtain can be avoided.

In the first prior system, the human intrusion into a vehicle can be detected but it is impossible to detect whether a moving object approaches or leaves the system. In the second and third prior systems, it is possible to detect whether a moving object approaches or leaves a system (a receiver), but a moving object cannot be detected when X and Y values change within the same quadrant.

DISCLOSURE OF THE INVENTION

It is therefore an object of the present invention to detect a moving object approaching or leaving a receiver without frequency analysis even when only components changing within the same quadrant in a two-dimensional coordinate system are obtained from a signal for generating energy waves and a signal received with the receiver.

A moving object detection system of the present invention comprises an oscillator, a transmitter, a receiver, a phase shifter, a first detection part, a second detection part, an existence detection part, an integrating part and an existence judgment part. The oscillator is configured to generate a first reference signal having a first frequency. The transmitter is configured to emit energy waves having the first frequency to a detection area in accordance with the first reference signal. The receiver is configured, when receiving incoming energy waves from the detection area, to generate an electric signal corresponding to the incoming energy waves. The phase shifter is configured to shift the phase of the first reference signal to produce a second reference signal. The first detection part is configured to mix the electric signal generated through the receiver with the first reference signal generated through the oscillator to produce a first detection signal. When at least one second frequency different from the first frequency is obtained from the electric signal, the first detection signal becomes a first Doppler shift signal that has a frequency of the difference between the first frequency and the at least one second frequency. The second detection part is configured to mix the electric signal generated through the receiver with the second reference signal produced through the phase shifter to produce a second detection signal. When the at least one second frequency is obtained from the electric signal, the second detection signal becomes a second Doppler shift signal that has a frequency of the difference between the first frequency and the at least one second frequency and is different in phase from the first Doppler shift signal. The existence detection part is configured, based on the first and second detection signals, to calculate a rotation angle of each transition factor that is obtained from the first and second detection signals and rotates around the origin of a two-dimensional coordinate system. The existence detection part is also configured so that the rotation angle becomes smaller than 90 degrees. The integrating part is configured to integrate each rotation angle calculated with the existence detection part to obtain an integrated angle. The existence judgment part is configured to judge whether or not a moving object approaching or leaving the receiver exists in the detection area based on the integrated angle and a threshold angle.

In this configuration, a rotation angle smaller than 90 degrees is obtained from the first and second detection signals and the rotation angle is utilized for existence judgment of a moving object, and accordingly a moving object approaching or leaving the receiver can be detected without frequency analysis even when only components changing within the same quadrant in the two-dimensional coordinate system are obtained from the first reference signal and the electric signal generated with the receiver.

The device is further provided with an angle correction part according to an aspect of the present invention. The angle correction part compares a value obtained from the first and second detection signals with an allowable reference. If the value obtained from the detection signals does not meet the allowable reference, the angle correction part adjusts a value related to the rotation angle calculated with the existence detection part to a predetermined value. The allowable reference is set based on a value or a range obtained from each first and second detection signals when a moving object approaching or leaving the receiver exists in the detection area. For example, if there exists, in the detection area, a noise source that may generate object noise such as small vibration, low frequency fluctuation or the like, or usual noise such as natural noise, circuit noise and so on, and then may increase or decrease the integrated angle, a value obtained from the first and second detection signals is generally different from a value obtained from the first and second detection signals when the aforementioned moving object exists in the detection area. Accordingly, this invention utilizes the allowable reference obtained when the moving object exists in the detection area, and adjusts a value related to the rotation angle calculated with the existence detection part to the predetermined value if the value obtained from the first and second detection signals does not meet the allowable reference. As a result, it can be prevented that false detection is made under the influence of the noise source when a moving object approaching or leaving the receiver does not exist in the detection area.

In a preferred embodiment, the angle correction part judges whether or not a ratio of levels of the first and second detection signals is within an allowable range. If the ratio is not within the allowable range, the angle correction part sets the corresponding rotation angle calculated with the existence detection part to zero or a predetermined minimum value. The allowable range is set based on a variation range in a ratio of levels of each first and second detection signals obtained when a moving object approaching or leaving the receiver object exists in the detection area. In this embodiment, the angle correction part can detect, for example, small vibration caused by noise source generating small vibration in the detection area based on the allowable range. Moreover, since the angle correction part sets the rotation angle to zero or the minimum value when the small vibration is detected, it can be prevented that false detection is made under the influence of the small vibration when a moving object approaching or leaving the receiver does not exist in the detection area.

In an enhanced embodiment, the angle correction part judges whether or not the aforementioned ratio is within the allowable range after coordinate transformation by which the two-dimensional coordinate system is rotated by a specified angle around the origin. In this embodiment, it can be prevented that false detection is made under the influence of object noise such that a locus of transition factors becomes an ellipse-shape of which major axis inclines in the two-dimensional coordinate system when a moving object approaching or leaving the receiver does not exist in the detection area.

In an alternate embodiment, the angle correction part judges whether or not the magnitude of a vector from the origin to the transition factor is smaller than an allowable minimum magnitude. If the magnitude of the vector is smaller than the allowable minimum magnitude, the angle correction part sets the corresponding rotation angle calculated with the existence detection part to zero or a predetermined minimum value. The allowable minimum magnitude is set based on the minimum magnitude in a vector of each transition factor obtained when a moving object approaching or leaving the receiver exists in the detection area. In this embodiment, it can be prevented that false detection is made under the influence of, for example, object noise outside the detection area when a moving object approaching or leaving the receiver does not exist in the detection area.

In an alternate embodiment, the angle correction part judges whether or not a ratio of change in magnitude of a vector from the origin to the transition factor is within an allowable range. If the ratio of change is not within the allowable range, the angle correction part sets the corresponding rotation angle calculated with the existence detection part to zero or a predetermined minimum value. The allowable range is set based on minimum and maximum ratios of change in magnitude of a vector from the origin to each transition factor obtained when a moving object approaching or leaving the receiver exists in the detection area. In this embodiment, when a target moving object approaching or leaving the receiver does not exist in the detection area, it can be prevented that false detection is made under the influence of a noise source moving faster or slower than the moving object.

In an alternate embodiment, the angle correction part judges whether or not the absolute value of the rotation angle calculated with the existence detection part is smaller than an allowable minimum angle. If the absolute value is smaller than the allowable minimum angle, the angle correction part sets the rotation angle to zero or a predetermined minimum value. The allowable minimum angle is set based on the minimum absolute value of each rotation angle obtained when a moving object approaching or leaving the receiver exists in the detection area. In this embodiment, it can be prevented that false detection is made under the influence of, for example, low frequency fluctuation when a target moving object approaching or leaving the receiver does not exist in the detection area.

In an alternate embodiment, the angle correction part judges whether or not the absolute value of the rotation angle calculated with the existence detection part is larger than an allowable maximum angle. If the absolute value is larger than the allowable maximum angle, the angle correction part sets the rotation angle to zero or a predetermined minimum value. The allowable maximum angle is set based on the maximum absolute value of each rotation angle obtained when a moving object approaching or leaving the receiver exists in the detection area. In this embodiment, when a target moving object approaching or leaving the receiver does not exist in the detection area, it can be prevented that false detection is made under the influence of a noise source moving faster than the moving object.

In an alternate embodiment, the angle correction part judges whether or not a value of change of the rotation angle calculated with the existence detection part is larger than an allowable maximum value. If the value of change is larger than the allowable maximum value, the angle correction part sets the rotation angle to zero or a predetermined minimum value. The allowable maximum value is set based on a maximum value of change of each rotation angle obtained when a moving object approaching or leaving the receiver exists in the detection area. In this embodiment, when a target moving object approaching or leaving the receiver does not exist in the detection area, it can be prevented that false detection is made under the influence of a noise source accelerating faster than the moving object.

In an alternate embodiment, the angle correction part judges whether or not the absolute value of an integrated angle within a constant time obtained from the existence detection part is smaller than an allowable minimum integrated angle. If the absolute value is smaller than the allowable minimum integrated angle, the angle correction part sets the integrated angle obtained by the integrating part to an initial value. The allowable minimum integrated angle is set based on the minimum absolute value of each integrated angle within each constant time obtained when a moving object approaching or leaving the receiver exists in the detection area. In this embodiment, it can be prevented that false detection is made under the influence of the aforementioned usual noise when a moving object approaching or leaving the receiver does not exist in the detection area.

In another alternate embodiment, the angle correction part judges whether or not the absolute value of an integrated angle within a constant time obtained from the existence detection part is smaller than an allowable minimum integrated angle. If the absolute value is smaller than the allowable minimum integrated angle, the angle correction part multiplies the integrated angle obtained by the integrating part by a coefficient less than 1. The allowable minimum integrated angle is set based on the minimum absolute value of each integrated angle within each constant time obtained when a moving object approaching or leaving the receiver exists in the detection area. In this embodiment, it can be prevented that false detection is made under the influence of the aforementioned usual noise when a moving object approaching or leaving the receiver does not exist in the detection area.

In an aspect of the present invention, the oscillator is a variable-frequency oscillator configured to vary the first frequency, and sequentially sets the first frequency to each of at least two sorts of frequencies. Also, when the judgment result that a moving object approaching or leaving the receiver exists in the detection area is obtained with respect to each of said at least two sorts of frequencies, the existence judgment part sends out an existence signal representing that the moving object exists in the detection area. In this invention, it can be prevented that false detection is made under the influence of small vibration, large energy waves from the detection area or the like when a moving object approaching or leaving the receiver does not exist in the detection area.

In a preferred embodiment, the oscillator has a bell-shaped frequency characteristic of which vertex corresponds to the center frequency at which energy of the energy waves becomes maximum. The oscillator also generates the first reference signal of which first frequency is sequentially set to each of said at least two sorts of frequencies between which the center frequency is located. In this embodiment, the variation in detectable movement distance can be reduced.

In a more preferred embodiment, energies of energy waves corresponding to said at least two sorts of frequencies are substantially the same as each other. In this embodiment, the variation in detectable movement distance can be suitably reduced.

In an preferred embodiment, after the first frequency is set to any of said at least two sorts of frequencies, the existence judgment part stops, during a predetermined standby time, judging whether or not a moving object approaching or leaving the receiver exists in the detection area. In this embodiment, it can be prevented that incoming energy waves corresponding to any one of said at least two sorts of frequencies interfere with incoming energy waves corresponding to another frequency of said at least two sorts of frequencies.

The standby time may be set to a longer time than the maximum time of each time between a point in time at which the transmitter emits said energy waves and a point in time at which the receiver receives incoming energy waves corresponding to the energy waves from the detection area.

In an preferred embodiment, after the first frequency is set to any of said at least two sorts of frequencies, at least the existence judgment part returns to an initial state if the judgment result that a moving object approaching or leaving the receiver exists in the detection area is not obtained with respect to the set frequency for a predetermined time limit. In this embodiment, it can be estimated that a previous existence judgment result has been made under the influence of small vibration, large energy waves from the detection area or the like. In addition, at least the existence judgment part returns to the initial state and thereby can provide for the next existence judgment.

BRIEF DESCRIPTION OF THE DRAWINGS

Preferred embodiments of the invention will now be described in further details. Other features and advantages of the present invention will become better understood with regard to the following detailed description and accompanying drawings where:

FIG. 4A illustrates a locus of transition factors obtained from an actual moving object, and a locus of transition factors obtained from small vibration or the like;

FIG. 4B is an explanatory diagram of coordinate transformation;

BEST MODE FOR CARRYING OUT THE INVENTION

Figure 1:
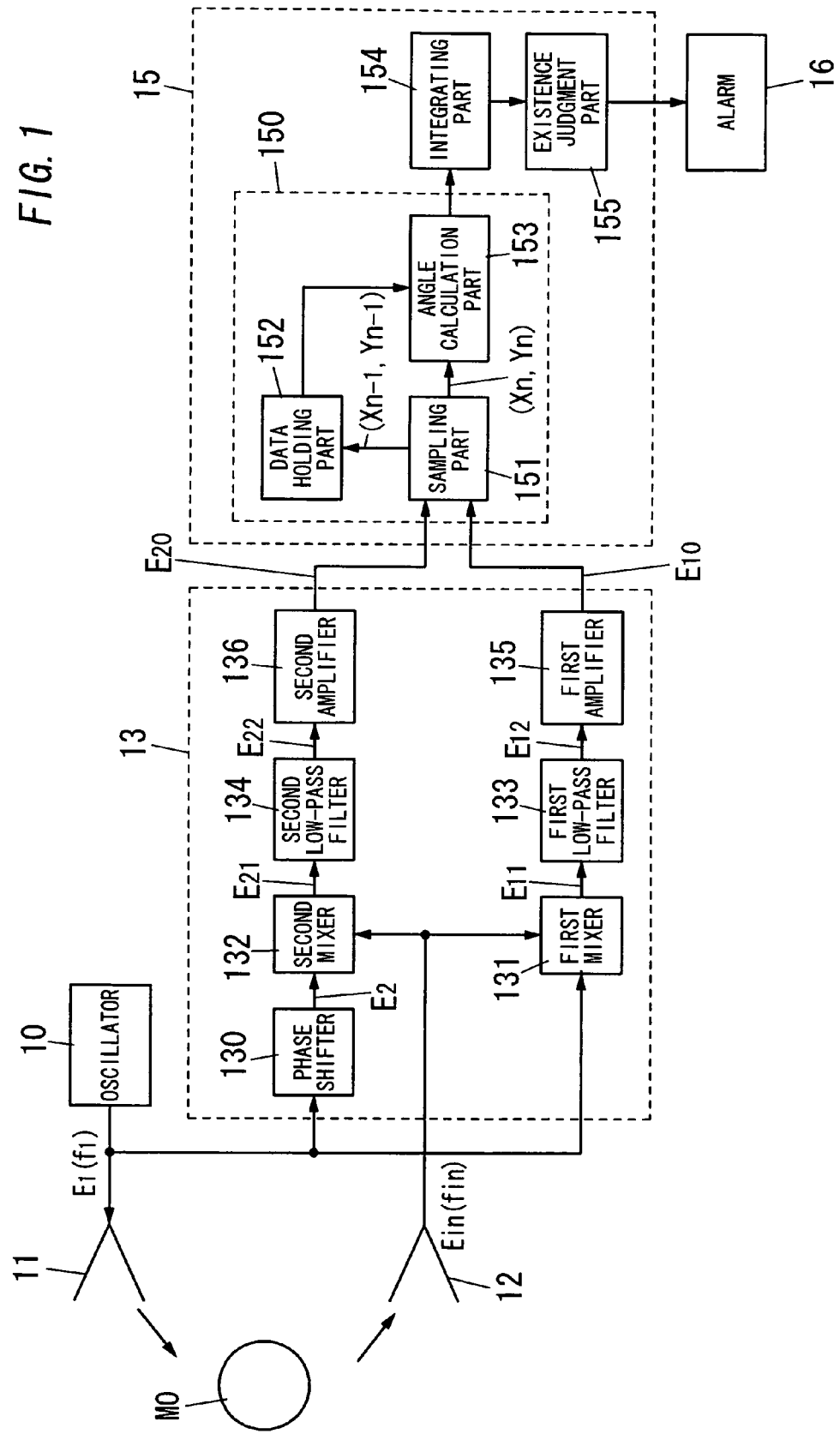
FIG. 1 is a block diagram of a first embodiment according to the invention.

FIG. 1 shows a first embodiment according to the present invention, namely a moving object detection system. This system belongs to an ultrasonic Doppler type, and has an oscillator 10, a transmitter 11, a receiver 12, a detection portion 13, a judgment portion 15 and an alarm 16.

For example, the oscillator 10 generates a reference signal (electric signal) $E_1$ having a first frequency (ultrasonic frequency) $f_1$ and supplies the signal $E_1$ to the transmitter 11 and the detection portion 13. However, not limited to this, the energy waves of the present invention may be micro waves or electric waves.

The transmitter 11 is configured to emit sine-wave shaped ultrasonic waves having the frequency $f_1$ to a detection area in accordance with the signal $E_1$ from the oscillator 10. For example, the transmitter 11 is formed of an output device such as a piezoelectric loudspeaker, a piezoelectric vibrator or the like, and a drive circuit that drives the output device in accordance with the signal $E_1$. The receiver 12 is configured: to receive incoming ultrasonic waves from the detection area; and then to produce an electric signal $E_{in}$ corresponding to the incoming ultrasonic waves to supply the signal $E_{in}$ to the detection portion 13. For example, the receiver 12 is formed of an input device such as a piezoelectric microphone, a piezoelectric vibrator or the like, and a signal processing circuit for amplification and waveform shaping of a signal obtained from the input device. However, not limited to these, the transmitter and the receiver of the present invention may include, for example, a transducer comprised of a piezoelectric vibrator or the like.

The detection portion 13 is formed of a phase shifter 130, first and second mixers 131 and 132, first and second low-pass filters 133 and 134, and first and second amplifiers 135 and 136, for example, in the same way as a conventional synchronous detection circuit. For example, the phase shifter 130 advances the phase of a first reference signal $E_1$ having a first frequency $f_1$ by 90° to produce a second reference signal $E_2$, and supplies the signal $E_2$ to the mixer 132.

Each of the first and second mixers 131 and 132 is, for example, a multiplication circuit. The mixer 131 mixes the signal $E_{in}$ with the signal $E_1$ to produce a mixed signal $E_{11}$, while the mixer 132 mixes the signal $E_{in}$ with the signal $E_2$ to produce a mixed signal $E_{21}$. The filters 133 and 134 remove high frequency components of the signals $E_{11}$ and $E_{21}$ to produce signals $E_{12}$ and $E_{22}$ and supply the signals $E_{12}$ and $E_{22}$ to the amplifiers 135 and 136, respectively. The amplifiers 135 and 136 respectively amplify the signals $E_{12}$ and $E_{22}$ to supply detection signals $E_{10}$ and $E_{20}$ to the judgment portion 15.

The operational principle of the detection portion 13 is explained. For example, when a moving object approaching or leaving the receiver 12 (hereinafter referred to as a "moving object MO") exists in the detection area and ultrasonic waves from the transmitter 11 are reflected by the moving object MO, the first frequency $f_1$ of the ultrasonic waves is shifted to at least one second frequency $f_{in}$ different from $f_1$ by the Doppler shift. In this instance, if the signals $E_{in}$ and $E_1$ are respectively represented by $A_{in} \sin(2\pi f_{in}t+\phi)$ and $A_1 \sin(2\pi f_1 t)$, a signal $E_{in}E_1$ obtained by mixing the signals is given by $$E_{in}E_1 = A_{in}A_1(\cos\{2\pi(f_{in}-f_1)t+\phi\} - \cos\{2\pi(f_{in}+f_1)t+\phi\})/2,$$

where $A_{in}$ and $A_1$ are respectively amplitudes of the signals $E_{in}$ and $E_1$, and $\phi$ is a phase. The component including $f_{in}+f_1$ is removed with the filter 133, and accordingly the detection signal $E_{10}$ obtained from the amplifier 135 corresponds to $A_{in}A_1(\cos\{2\pi(f_{in}-f_1)t+\phi\})/2$ and includes $\cos\{2\pi(f_{in}-f_1)t+\phi\}$ as the main component. That is, when a moving object MO exists in the detection area, the signal $E_{10}$ becomes a first Doppler shift signal (beat signal) that has the frequency of the difference between the first frequency $f_1$ and the second frequency $f_{in}$.

Similarly, if the signal $E_2$ is represented by $A_2 \cos(2\pi f_1 t)$, a signal $E_{in}E_2$ obtained by mixing the signal $E_{in}$ and the signal $E_2$ is given by $$E_{in}E_2 = A_{in}A_2(\sin\{2\pi(f_{in}-f_1)t+\phi\} + \sin\{2\pi(f_{in}+f_1)t+\phi\})/2,$$

where $A_2$ is amplitude of the signal $E_2$. Since the component including $f_{in}+f_1$ is removed with the filter 134, the detection signal $E_{20}$ obtained from the amplifier 136 corresponds to $A_{in}A_2(\sin\{2\pi(f_{in}-f_1)t+\phi\})/2$ and includes $\sin\{2\pi(f_{in}-f_1)t+\phi\}$ as the main component. That is, when a moving object MO exists in the detection area, the signal $E_{20}$ becomes a second Doppler shift signal that has the frequency of the difference between the first frequency $f_1$ and the second frequency $f_{in}$ and is different in phase by 90° from the first Doppler shift signal.

The judgment portion 15 is formed of, for example, a micon (microcomputer) including a CPU, a storage device and A/D converters, and so on. In addition, the judgment portion 15 has an existence detection part 150 including a sampling part 151, a data holding part 152 and an angle calculation part 153, and also has an integrating part 154 and an existence judgment part 155. However, not limited to this, the sampling part 151, the data holding part 152, the angle calculation part 153, the integrating part 154 and the existence judgment part 155 may be formed of circuits (a sampling circuit, a storage circuit, an arithmetic circuit, an integrating circuit and a threshold circuit).

The sampling part 151 is formed of the aforementioned A/D converters, and respectively converts the first and second detection signals $E_{10}$ and $E_{20}$ from the detection portion 13 into digital values X and Y to obtain the transition factor specified by the digital values X and Y. The data holding part 152 is formed of, for example, a storage device (memory) and, whenever the sampling part 151 obtains a transition factor, replaces its holding data with the transition factor (digital values X and Y). However, not limited to this, the data holding part 152 may store transition factors.

Figure 2A:
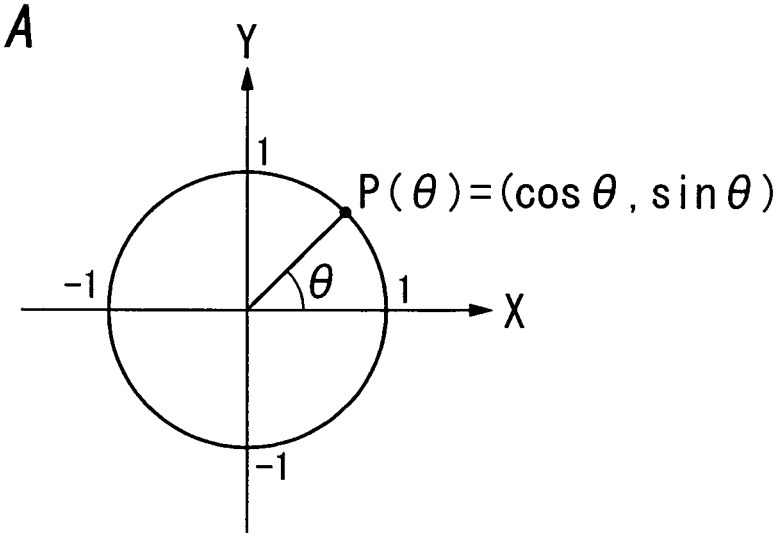
FIG. 2A is an explanatory diagram of a rotation angle of transition factors extracted by the first embodiment.
Figure 2B:
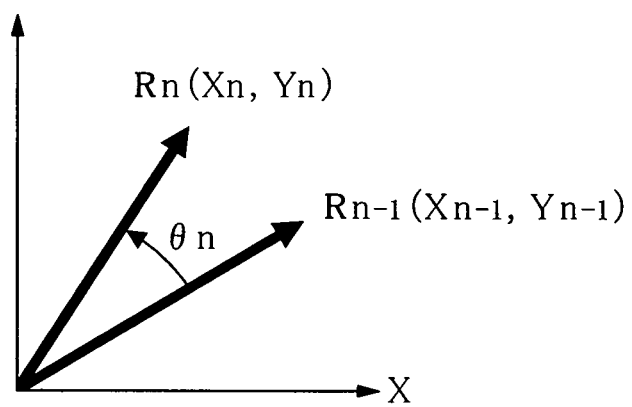
FIG. 2B is an explanatory diagram of the rotation angle of the transition factors.
Figure 2C:
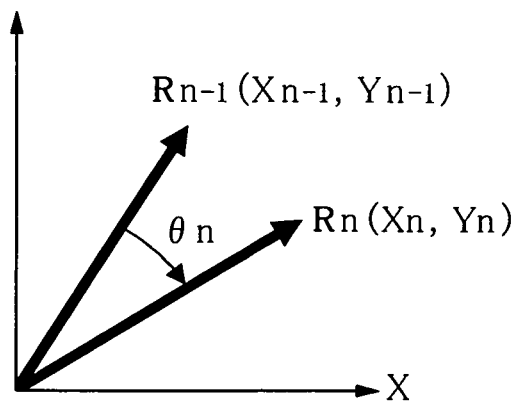
FIG. 2C is an explanatory diagram of the rotation angle of the transition factors.

The angle calculation part 153 is configured to calculate a rotation angle of each transition factor that rotates around the origin of a two-dimensional coordinate system. In the first embodiment, based on a current transition factor obtained from the sampling part 151 and a previous transition factor held by the data holding part 152, the angle calculation part 153 calculates a rotation angle of the current transition factor with respect to the previous transition factor before the data holding part 152 renews the holding data. This rotation angle is explained. As shown in FIG. 2A, when a point $P(\theta)$ is on the circumference of a circle of radius 1, the point $P(\theta)$ turns counterclockwise around the origin of the X-Y coordinate system in response to increasing of an angle $\theta$, and turns clockwise in response to decreasing of the angle $\theta$. Therefore, the transition factor (X, Y) turns counterclockwise around the origin of the coordinate system as shown in FIG. 2B when a moving object MO approaches the receiver 12 ($f_{in}>f_1$), while the transition factor (X, Y) turns clockwise as shown in FIG. 2C when the moving object MO leaves the receiver 12 ($f_{in}<f_1$). The rotation angle $\theta_n$ shown in FIGS. 2B and 2C is given by $$\theta_n = \arctan\{(X_{n-1}Y_n - Y_{n-1}X_n)/(X_{n-1}X_n + Y_{n-1}Y_n)\},$$

where $X_n$ and $Y_n$ represent a current transition factor, and $X_{n-1}$ and $Y_{n-1}$ represent a previous transition factor. The angle calculation part 153 calculates a rotation angle $\theta_n$ by the aforementioned formula. The polarity of the rotation angle $\theta_n$ becomes positive when a moving object MO approaches the receiver 12, and becomes negative when a moving object MO leaves the receiver 12. In addition, each of the A/D converters constituting the sampling part 151 generally operates at a sampling frequency such that the rotation angle $\theta_n$ calculated with the angle calculation part 153 becomes much smaller than 90 degrees (e.g., equal to or more than four times of a maximum frequency difference between the first and second frequencies).

The integrating part 154 integrates each rotation angle calculated with the angle calculation part 153 to obtain an integrated angle $(\theta_1+\theta_2+\ldots+\theta_n+\ldots)$. This integrated angle is in proportion to a movement distance of the moving object MO. The existence judgment part 155 judges whether or not a moving object MO exists in the detection area based on the integrated angle and a predetermined threshold angle. For example, if the absolute value of an integrated angle is larger than the threshold angle, the existence judgment part 155 supplies the alarm 16 with an existence signal representing that a moving object MO exists in the detection area.

The alarm 16 is formed of, for example, a buzzer and a buzzer driving circuit, and gives an alarm when receiving the existence signal from the existence judgment part 155. As another example, the alarm 16 may be an indication circuit, a communication device or the like.

The operation of the first embodiment is explained. The transmitter 11 emits ultrasonic waves having the frequency $f_1$ to the detection area in accordance with the signal $E_1$ from the oscillator 10, while the detection portion 13 produces detection signals $E_{10}$ and $E_{20}$ in response to the signal $E_{in}$ from the receiver 12 and then supplies the signals to the judgment portion 15. In the judgment portion 15, whenever the sampling part 151 takes X and Y of a transition factor from the signals $E_{10}$ and $E_{20}$, the angle calculation part 153 calculates a rotation angle and the integrating part 154 renews the integrated angle by adding the rotation angle to the current integrated angle. If the integrated angle becomes larger than the threshold angle, the existence judgment part 155 supplies an existence signal to the alarm 16. In response to the existence signal, the alarm 16 gives an alarm.

In the first embodiment, a rotation angle $\theta_n$ smaller than 90 degrees is obtained from the first and second detection signals and is utilized for existence judgment of a moving object MO, and accordingly the moving object MO can be detected without frequency analysis even when only components changing within the same quadrant in an X-Y coordinate system are obtained from the signals $E_1$ and $E_{in}$.

Figure 3:
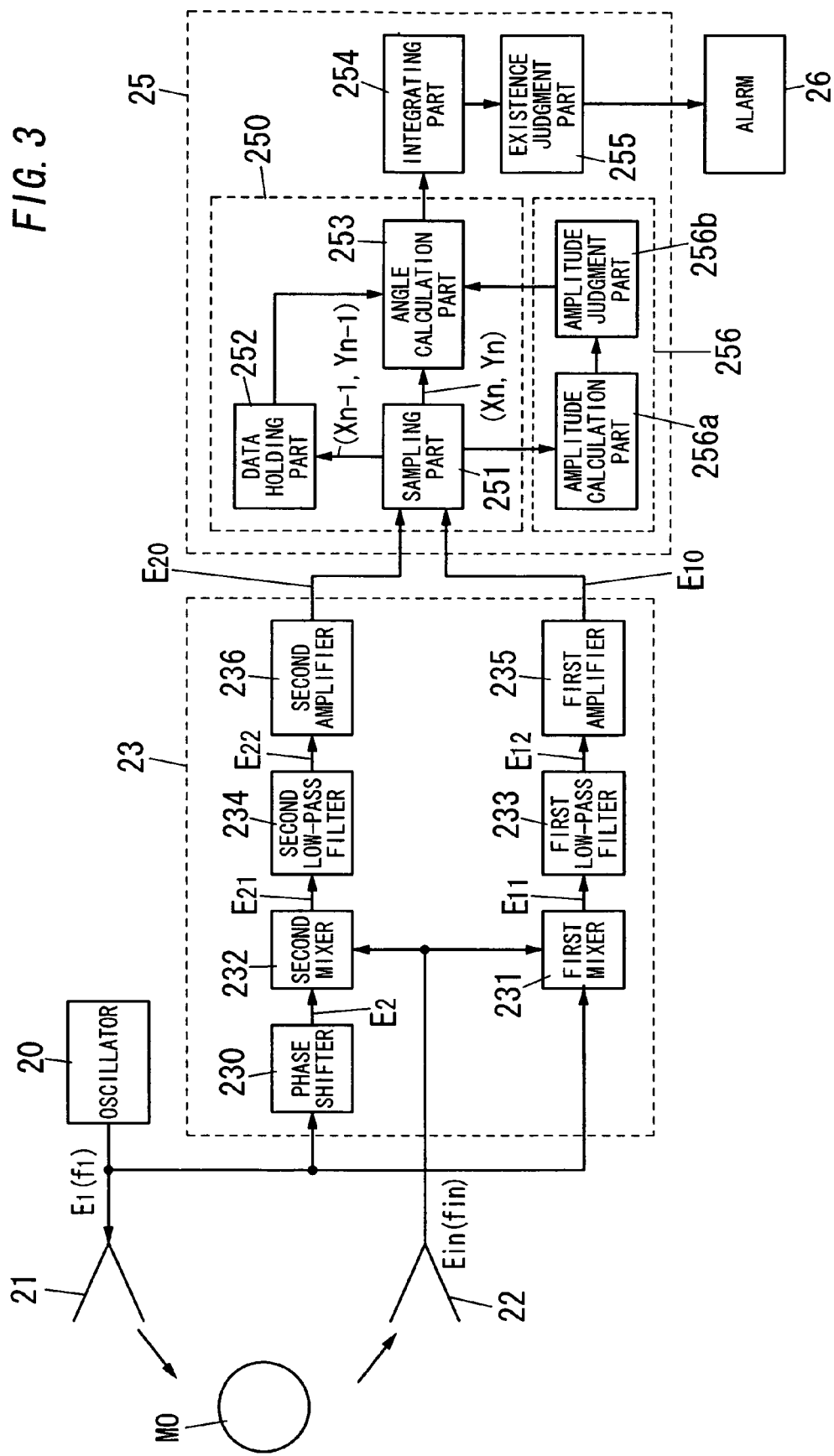
FIG. 3 is a block diagram of a second embodiment according to the invention.

FIG. 3 shows a second embodiment according to the present invention, namely a moving object detection system. In addition to an oscillator 20, a transmitter 21, a receiver 22, a detection portion 23 and an alarm 26 which are configured in the same way as the first embodiment, this system is provided with a judgment portion 25.

The judgment portion 25 is formed of, for example, a micon including a CPU, a storage device and A/D converters, and so on. In addition to an existence detection part 250 (a sampling part 251, a data holding part 252 and an angle calculation part 253), an integrating part 254 and an existence judgment part 255 which are configured like the first embodiment, this judgment portion 25 is provided with an angle correction part 256 according to an aspect of the second embodiment. The angle correction part 256 is formed of an amplitude calculation part 256a and an amplitude judgment part 256b. However, the amplitude calculation part 256a, the amplitude judgment part 256b and so on are not limited to the micon, but may be formed of circuits (an amplitude calculation circuit, an amplitude judgment circuit and so on).

The amplitude calculation part 256a takes digital values $X_n$ and $Y_n$ corresponding to levels of first and second detection signals $E_{10}$ and $E_{20}$ from the sampling part 251 and calculates effective values of the digital values $X_n$ and $Y_n$ to supply to the amplitude judgment part 256b. The amplitude judgment part 256b judges whether or not a ratio of the effective values is within an allowable range. If the ratio is not within the allowable range, the amplitude judgment part 256b sets the corresponding rotation angle calculated with the existence detection part 250 to zero or a predetermined minimum value. The allowable range is set based on a variation range in a ratio of effective values of each digital values $X_n$ and $Y_n$ obtained during existence of a moving object MO in the detection area, under conditions without small vibration, low frequency fluctuation and so on (hereinafter referred to as "object noise") except natural noise, circuit noise and so on (hereinafter referred to as "usual noise"). Concretely, the ratio spreads to a range including "1" when a moving object MO exists in the detection area and accordingly, based on the range, the lower limit of the allowable range is set to a value smaller than "1" and the upper limit is set to a value larger than "1".

In the first embodiment, for example, when a window glass of a vehicle with the moving object detection system generates small vibration in response to vibration from other vehicle passing nearby, there is an issue that incoming ultrasonic waves from the transmitter 11 receives phase modulation caused by the small vibration. Such small vibration generates, and then even if a moving object MO does not exist in a detection area, each transition factor specified by digital values $X_n$ and $Y_n$ rotates around the origin of the X-Y coordinate system. In this case, noise components caused by the small vibration are added to the digital values $X_n$ and $Y_n$ and thereby a big difference occurs between the digital values $X_n$ and $Y_n$. As a result, the locus of each transition factor under the influence of the small vibration becomes an elliptical shape as shown in A or B of FIG. 4A. Therefore, in the second embodiment, the allowable range is utilized in order to distinguish such an elliptical locus from the normal circular locus as shown in C of FIG. 4A. If the lower limit of the allowable range is set to e.g., 0.3-0.6 and the upper limit is set to e.g., 1.4-1.7, the elliptical locus can be distinguished from the normal circular locus.

In the second embodiment, the angle correction part 256 can detect the aforementioned small vibration based on a ratio of levels of first and second detection signals and the allowable range. Moreover, when small vibration is detected, the angle correction part 256 sets a corresponding rotation angle to zero or the predetermined minimum value, and accordingly it can be prevented that false detection is made under the influence of small vibration when a moving object MO does not exist in the detection area.

Figure 4:
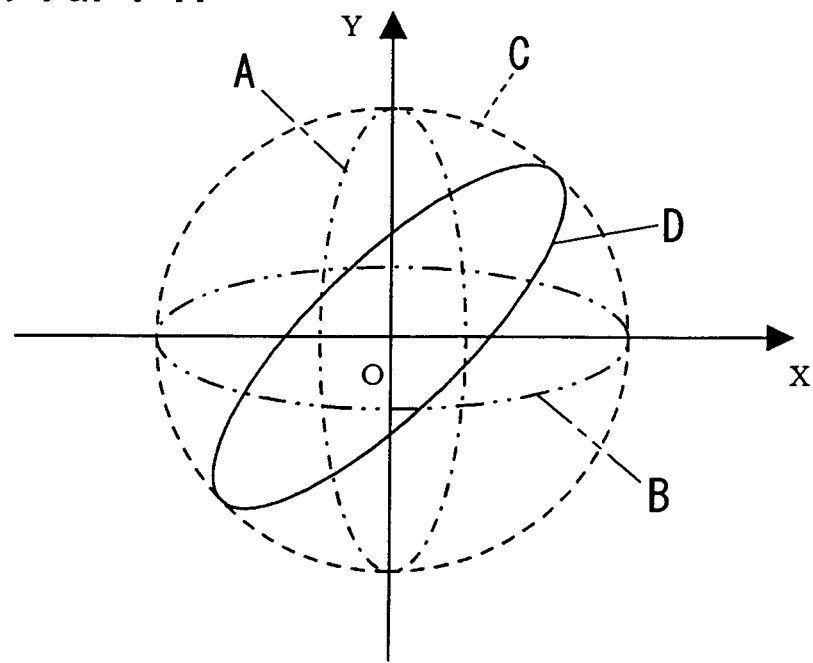
Figure 4:
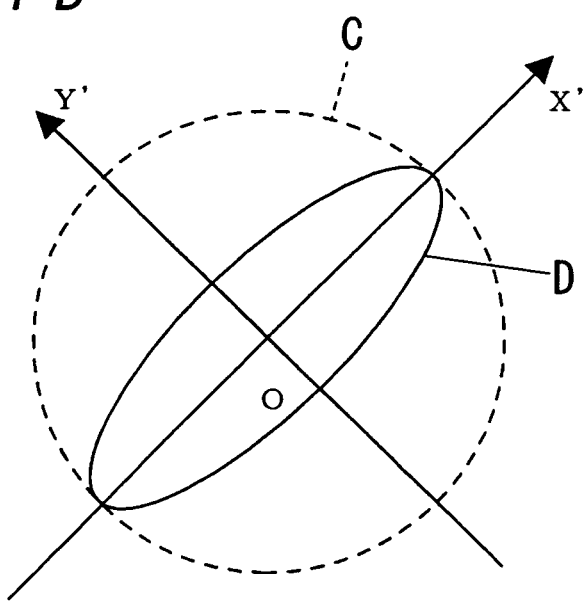

In an enhanced embodiment, after the coordinate transformation by which an X-Y coordinate system is rotated by a specified angle around the origin, the angle correction part 256 judges whether or not a ratio of effective values of digital values $X_n$ and $Y_n$ is within the allowable range. If the allowable range is utilized, an elliptical locus of which long axis is along the X-axis or the Y-axis can be distinguished from a normal circular locus, but an elliptical locus of which long axis is along an inclined axis as shown in D of FIG. 4A cannot be distinguished from a normal circular locus. That is, a ratio of effective values of digital values $X_n$ and $Y_n$ may exist in the allowable range. In order to solve this problem, the angle correction part 256 in this embodiment rotates the X-Y coordinate system around the origin by the specified angle (e.g., 45 degrees) as shown in FIG. 4B. As a result, it can be prevented that false detection is made under the influence of object noise such that a locus of each transition factor becomes an elliptical shape of which long axis is along an inclined axis in the X-Y coordinate system when a moving object MO does not exist in the detection area.

Figure 5:
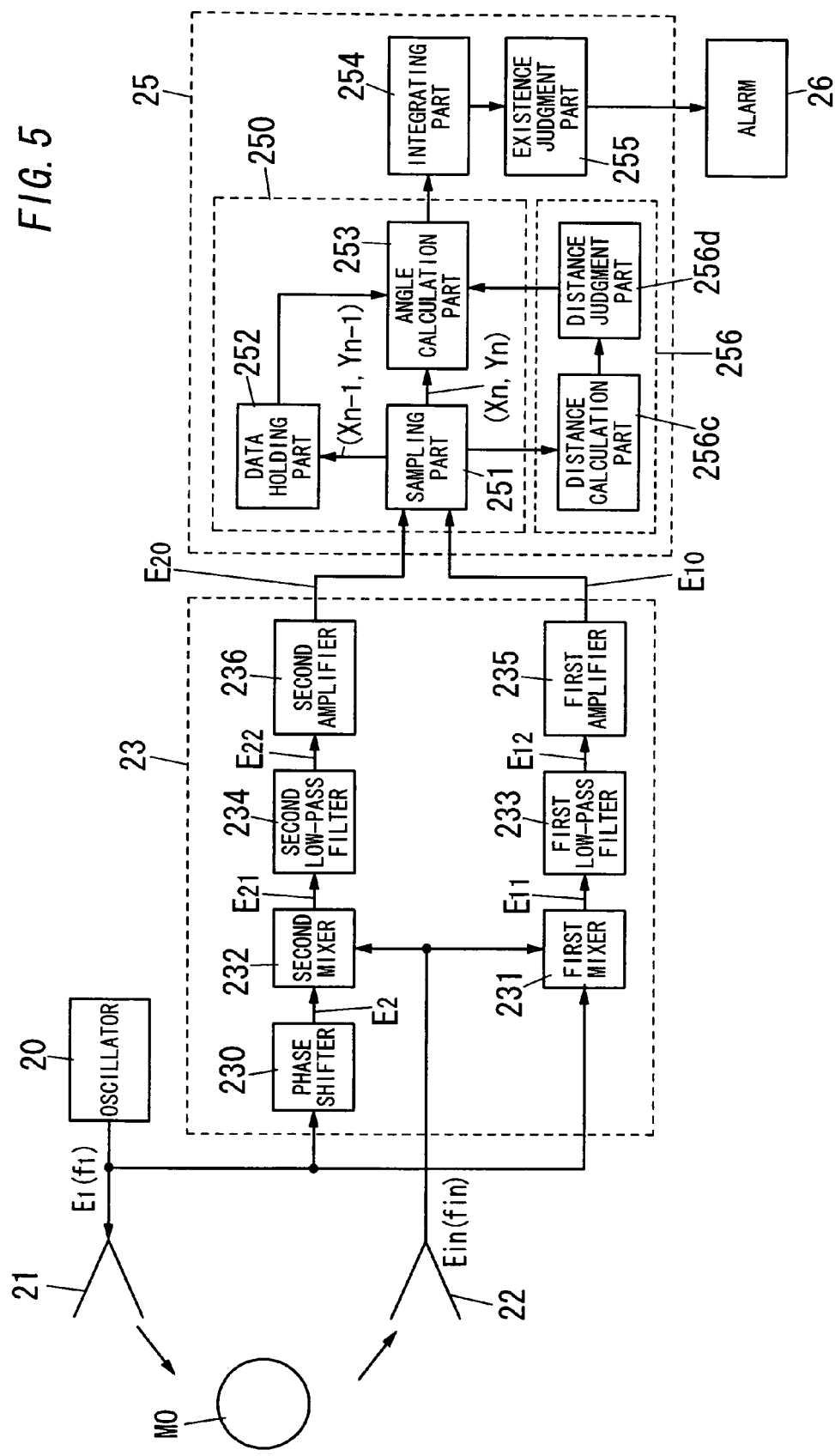
FIG. 5 is a block diagram of an alternate embodiment.

In an alternate embodiment, as shown in FIG. 5, the angle correction part 256 is formed of a magnitude calculation part 256c and a magnitude judgment part 256d. These are not limited to a micon, but may be formed of circuits (a magnitude calculation circuit and a magnitude judgment circuit). The magnitude calculation part 256c takes digital values $X_n$ and $Y_n$ corresponding to levels of first and second detection signals $E_{10}$ and $E_{20}$ from the sampling part 251 and calculates the magnitude of the vector from the origin to a transition factor $(X_n, Y_n)$ based on the digital values. That is, the magnitude calculation part 256c calculates the magnitude of the vector by $(X_n^2+Y_n^2)^{1/2}$. The magnitude judgment part 256d judges whether or not the magnitude of the vector is smaller than an allowable minimum magnitude. If the magnitude of the vector is smaller than the allowable minimum magnitude, the magnitude judgment part 256d sets the corresponding rotation angle calculated with the existence detection part 250 to zero or a predetermined minimum value. For example, under conditions without noise from the outside of the detection area (i.e., object noise), the allowable minimum magnitude is set based on a minimum magnitude of vector of each transition factor obtained when a moving object MO exists in a detection area. The allowable minimum magnitude is substantially set to, for example, the minimum magnitude. The magnitude of vector of a transition factor increases when a moving object MO approaches the receiver 22, and decreases when a moving object MO leaves the receiver 22. Therefore, the allowable minimum magnitude corresponds to the maximum distance between the boundary of the detection area and the receiver 22, and accordingly the allowable minimum magnitude is adjusted and thereby it is possible to eliminate moving objects farther than the maximum distance corresponding to the allowable minimum magnitude, or to reduce the influence of those moving objects.

However, not limited to this, the angle correction part 256 may judge whether or not a value of change in magnitude of the vector from the origin to a transition factor is within an allowable range. In this instance, if the value of change is not within the allowable range, the angle correction part 256 sets the corresponding rotation angle calculated with the existence detection part 250 to zero or a predetermined minimum value. Under conditions without object noise that is not obtained from a moving object MO except usual noise, the allowable range is set based on minimum and maximum values of change in magnitude of a vector from the origin to each transition factor obtained when a moving object MO exists in the detection area. For example, the allowable range is set to the range corresponding to the minimum and maximum values. If a target moving object MO is human, magnitude of a vector of each transition factor hardly changes during a sampling period of the sampling part 251 in general. Therefore, when the allowable range is set based on a human movement speed, if a value of change in magnitude of the vector of a transition factor is larger than the upper limit of the allowable range, it can be estimated that the moving object is a noise source that moves faster than humans (e.g., other vehicle). Conversely, if the value of change is smaller than the lower limit of the allowable range, it can be estimated that the moving object is a noise source that moves slower than humans. For example, the angle correction part 256 obtains a ratio of the magnitude of the vector of the current transition factor $(X_n, Y_n)$ to the magnitude of the vector of the previous transition factor $(X_{n-1}, Y_{n-1})$, and then judges whether the ratio is larger than the upper limit of the allowable range (>1) or smaller than the lower limit of the allowable range (<1). In this configuration, when a target moving object MO does not exist in the detection area, it can be prevented that false detection is made under the influence of a noise source moving faster or slower than the moving object MO.

Figure 6:
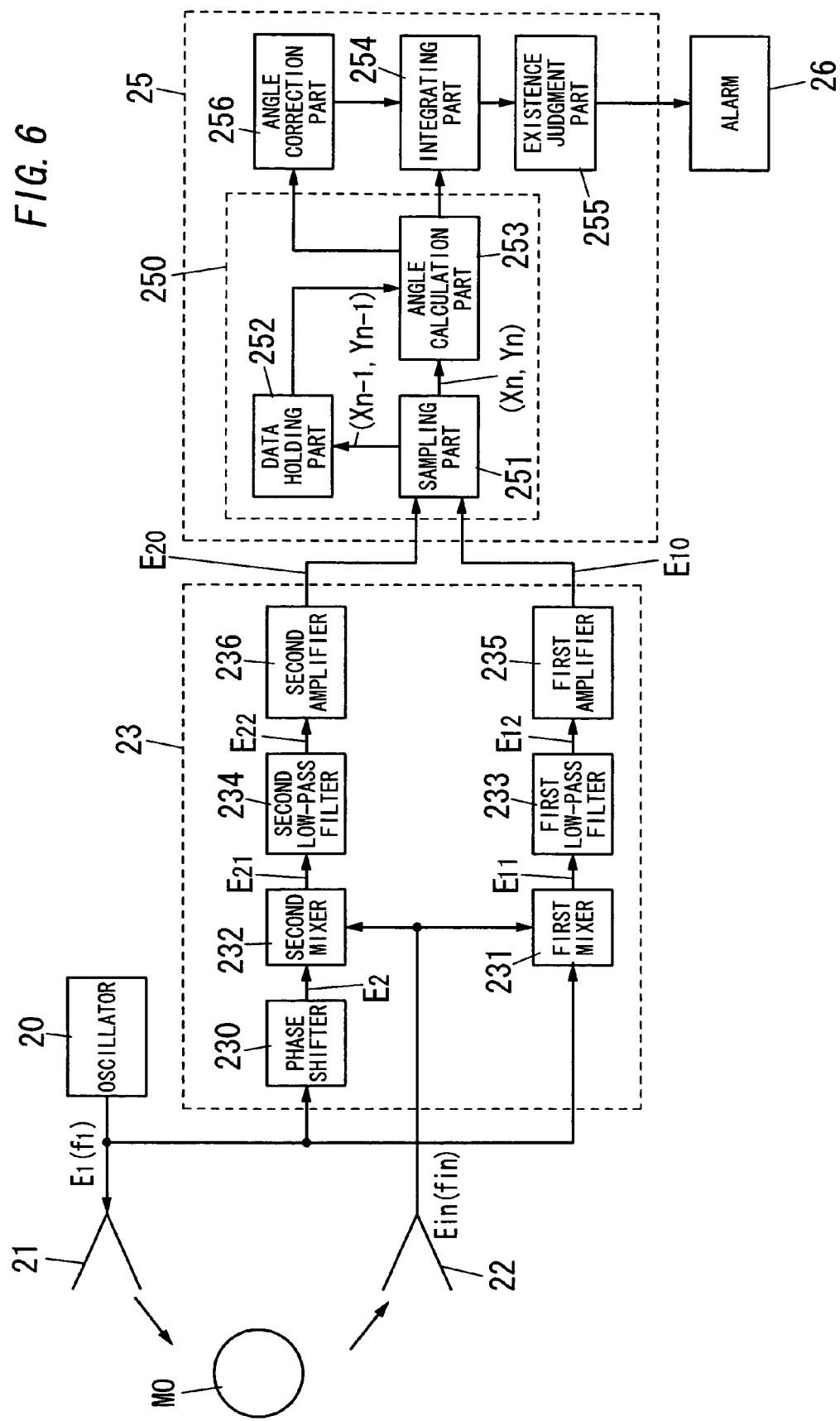
FIG. 6 is a block diagram of an alternate embodiment.

In an alternate embodiment, as shown in FIG. 6, the angle correction part 256 judges whether or not the absolute value of a rotation angle $\theta_n$ to calculated with the existence detection part 250 is smaller than an allowable minimum angle. If the absolute value is smaller than the allowable minimum angle, the angle correction part 256 sets the rotation angle $\theta_n$ to zero or a predetermined minimum value. Under conditions without low frequency fluctuation, the allowable minimum angle is set based on the minimum absolute value of each rotation angle obtained when a moving object MO exists in the detection area. For example, the allowable minimum angle is substantially set to the minimum absolute value. This angle correction part 256 is not limited to a micon, but may be formed of a circuit (an angle correction circuit). In the first embodiment, for example, if the air within a vehicle with the moving object detection system moves by wind from its window which is slightly opened, there is an issue that low frequency fluctuation component caused by the air movement is superimposed on a signal obtained from the receiver 12. In this embodiment, if the absolute value of a rotation angle $\theta_n$ is smaller than the allowable minimum angle, the rotation angle $\theta_n$ is set to zero or the predetermined minimum value and accordingly it can be prevented that false detection is made under the influence of low frequency fluctuation when a moving object MO does not exist in the detection area.

However, not limited to this, the angle correction part 256 may judge whether or not the absolute value of a rotation angle $\theta_n$ calculated with the existence detection part 250 is larger than an allowable maximum angle. In this instance, if the absolute value is larger than the allowable maximum angle, the angle correction part 256 sets the rotation angle $\theta_n$ to zero or a predetermined minimum value. Under conditions without object noise that is not obtained from a moving object MO except usual noise, the allowable maximum angle is set based on the maximum absolute value of each rotation angle obtained when a moving object MO exists in the detection area. For example, the allowable maximum angle is set to a value that is slightly larger than the maximum absolute value. When a target moving object MO is human, if the allowable maximum angle is set to an angle corresponding to a speed faster than a speed of human movement, it can be estimated that a rotation angle $\theta_n$ is generated by noise except humans when the absolute value of the rotation angle $\theta_n$ is larger than the allowable maximum angle. Therefore, when a target moving object MO does not exist in the detection area, it can be prevented that false detection is made under the influence of a noise source moving faster than a moving object MO.

Figure 7:
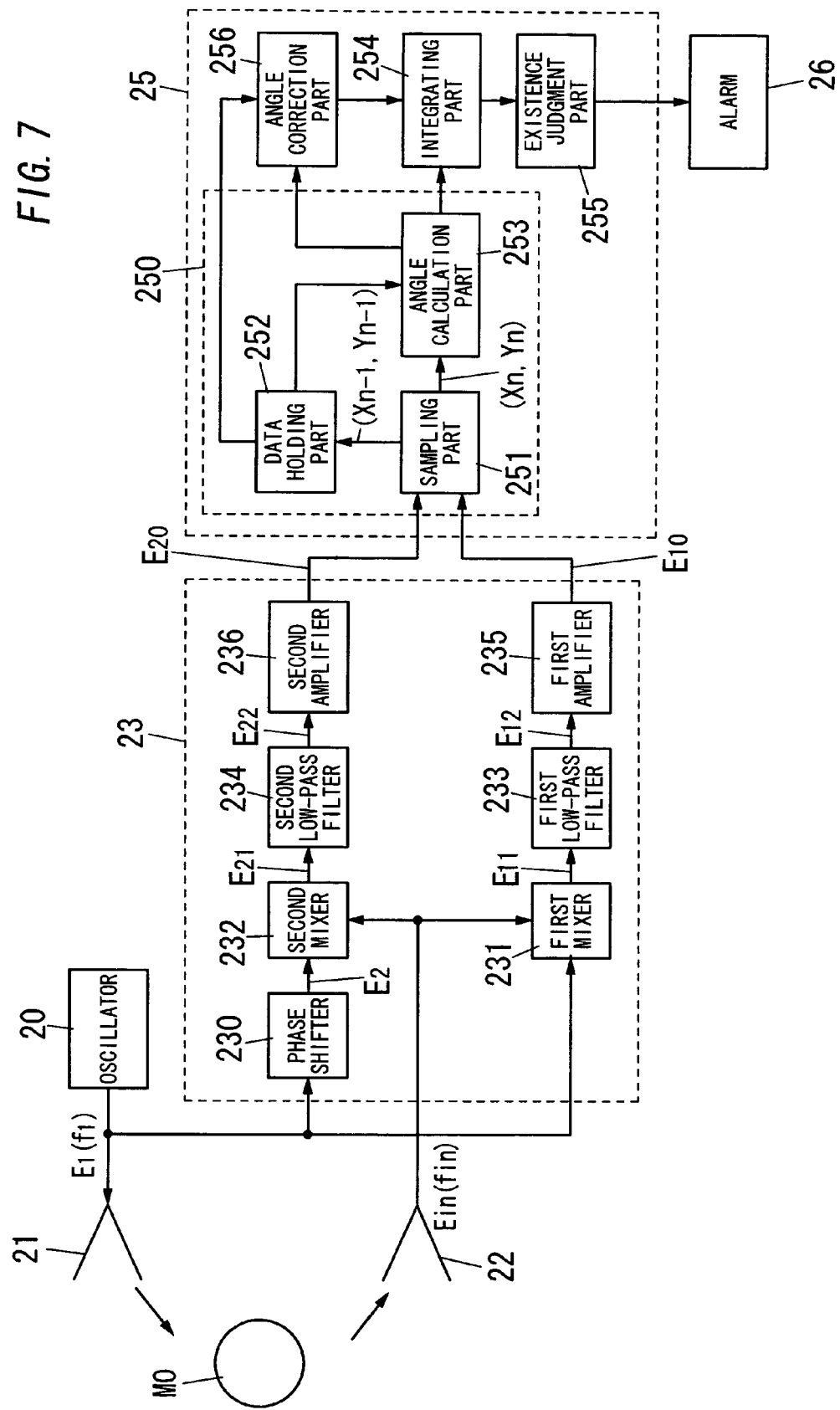
FIG. 7 is a block diagram of an alternate embodiment.

In an alternate embodiment, as shown in FIG. 7, the angle correction part 256 may judge whether or not a value of change of a rotation angle calculated with the existence detection part 250 is out of an allowable change range. In this instance, if the value of change is out of the allowable change range, the angle correction part 256 sets the rotation angle to zero or a predetermined minimum value. In other words, if the value of change is larger than the upper limit of the range (an allowable maximum value) or smaller than the lower limit of the range (an allowable minimum value), the angle correction part 256 sets the rotation angle to zero or the predetermined minimum value. Under conditions without object noise that is not obtained from a target moving object MO except usual noise, the allowable change range is set based on maximum and minimum values of change of each rotation angle obtained when a moving object MO exists in the detection area. The allowable change range is set to, for example, the range corresponding to the maximum and minimum values. For example, the angle correction part 256 calculates the absolute value of the difference between a rotation angle $\theta_n$ from the angle calculation part 253 and a rotation angle $\theta_{n-1}$ from the data holding part 252, and then sets the rotation angle $\theta_n$ to zero or the predetermined minimum value if the absolute value is out of the allowable change range. Therefore, when a target moving object MO is human, if the allowable change range is set to a range corresponding to acceleration of human movement, it can be estimated whether or not the absolute value is generated by noise except humans. As a result, when a target moving object MO does not exist in the detection area, it can be prevented that false detection is made under the influence of a noise source accelerating faster or slower than a moving object MO. Incidentally, this angle correction part 256 is not limited to a micon, but may be formed of a circuit (an angle difference judgment circuit, etc.).

Figure 8:
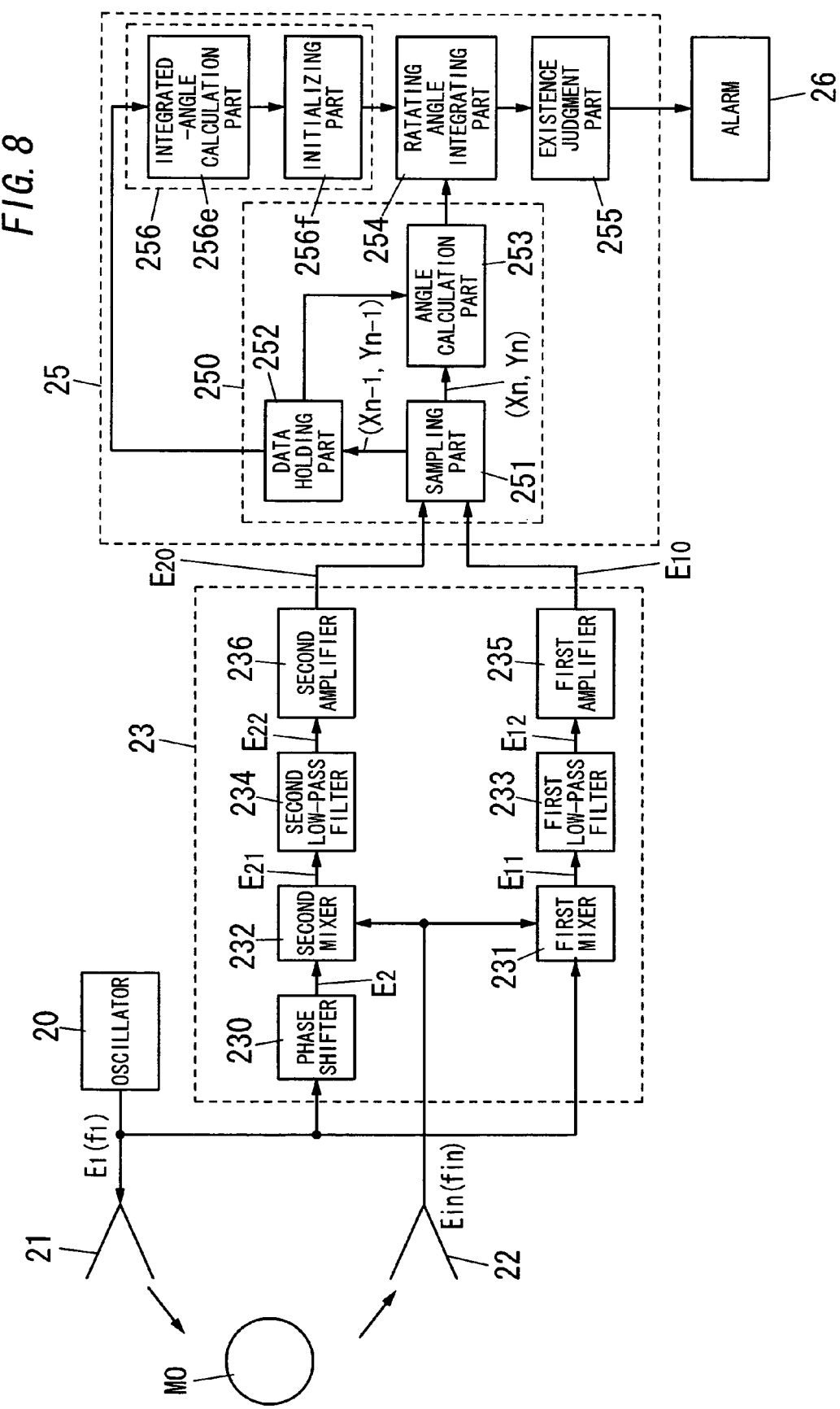
FIG. 8 is a block diagram of an alternate embodiment.

In an alternate embodiment, as shown in FIG. 8, the angle correction part 256 is formed of an integrated-angle calculation part 256e and an initializing part 256f. These are not limited to a micon, but may be formed of circuits (an integrated-angle calculation circuit and an initializing circuit). Also, in this embodiment, the data holding part 252 stores rotation angles calculated with the angle calculation part 253. The integrated-angle calculation part 256e takes rotation angles within a constant time from the data holding part 252, and calculates an integrated angle of the rotation angles. The initializing part 256f judges whether or not the absolute value of the integrated angle is smaller than an allowable minimum integrated angle, and sets the integrated angle obtained by the integrating part 254 to an initial value (e.g., zero or about zero) if the absolute value is smaller than the allowable minimum integrated angle. Under conditions without noise except usual noise, the allowable minimum integrated angle is set based on the minimum integrated angle of each integrated angle within each constant time obtained when a moving object MO exists in the detection area. For example, the allowable minimum integrated angle is set to an angle larger than the minimum integrated angle. In the first embodiment, even if a moving object MO does not exist in the detection area, an integrated angle obtained by the integrating part 254 may include an error accumulated in response to increasing of the integral number of times, and therefore there is a possibility that the absolute value of the integrated angle becomes larger than said threshold angle. In this alternate embodiment, when an integrated angle within a constant time is smaller than the allowable minimum integrated angle, an integrated angle obtained by the integrating part 254 is set to an initial value. As a result, it can be prevented that false detection is made under the influence of usual noise when a moving object MO does not exist in the detection area. In addition, when a moving object MO exists in the detection area, an integrated angle within a constant time is larger than the allowable minimum integrated angle and accordingly a moving object MO can be detected like each of the aforementioned embodiments.

However, not limited to this, the initializing part 256f may multiply an integrated angle obtained by the integrating part 254 by a coefficient less than 1 if the absolute value of the integrated angle is smaller than the allowable minimum integrated angle. Also in this instance, it can be prevented that false detection is made under the influence of usual noise when a moving object MO does not exist in the detection area.

Figure 9:
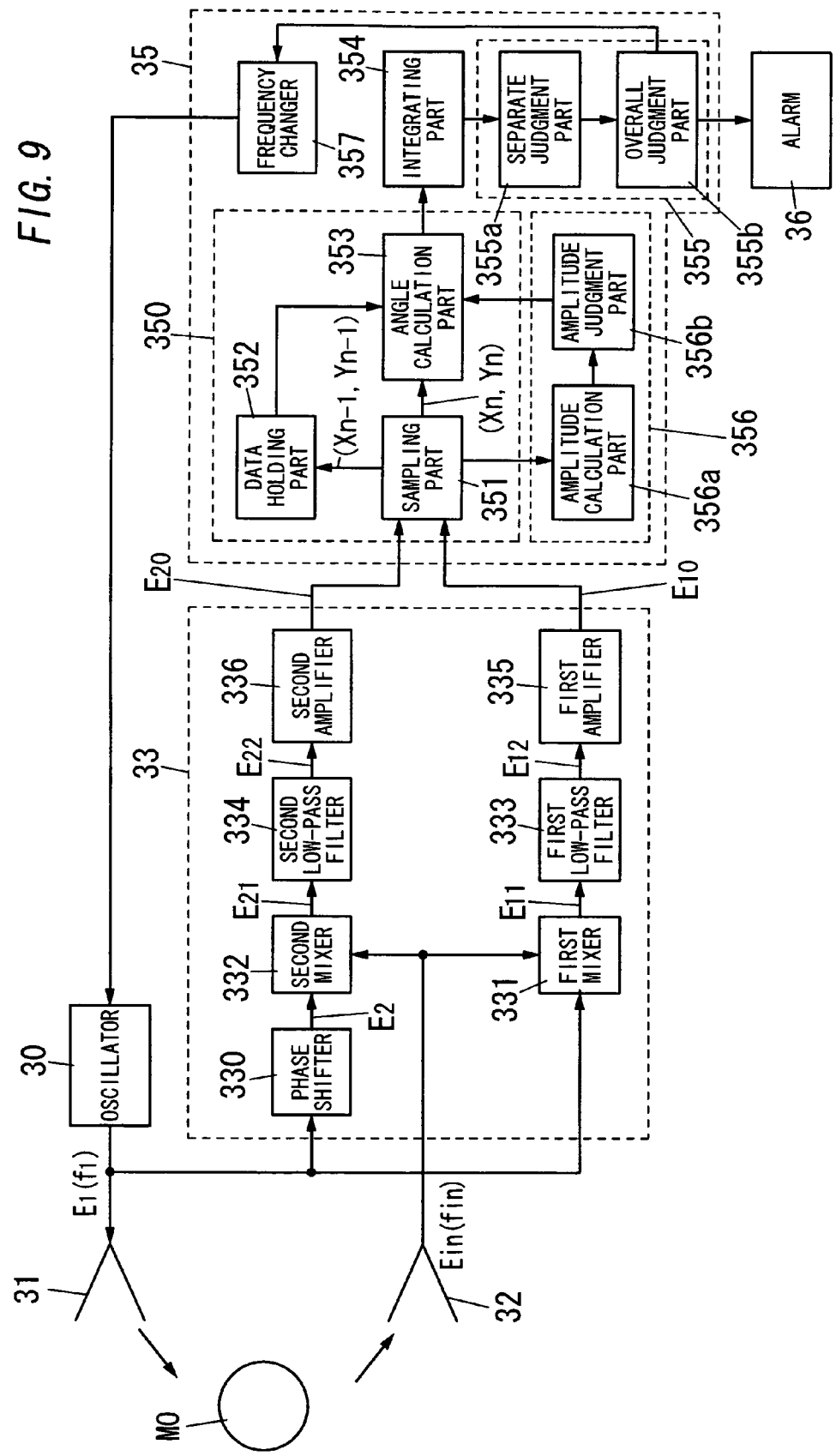
FIG. 9 is a block diagram of a third embodiment according to the invention.

FIG. 9 shows a third embodiment according to the present invention, namely a moving object detection system. Besides a transmitter 31, a receiver 32, a detection portion 33 and an alarm 36 which are configured like the second embodiment, this device is provided with an oscillator 30 and a judgment portion 35.

The oscillator 30 is a variable-frequency oscillator, e.g., a voltage controlled oscillator (VCO). This oscillator 30 sets a first frequency (ultrasonic frequency) $f_1$ to any of at least two sorts of frequencies in accordance with a control signal from the judgment portion 35, and generates a reference signal (electric signal) $E_1$ having the first frequency $f_1$ to supply the signal $E_1$ to the transmitter 31 and the detection portion 33. For example, the oscillator 30 sets the first frequency $f_1$ to any of frequencies $f_{11}$ and $f_{12}$ in accordance with the control signal.

In addition to an existence detection part 350, an integrating part 354 and an angle correction part 356 which are configured like the second embodiment, the judgment portion 35 has an existence judgment part 355 (a separate judgment part 355a and an overall judgment part 355b) and a frequency changer 357, and is configured of, for example, a micon including a CPU and a storage device, and so on. However, not limited to this, the existence detection part 350, the integrating part 354, the existence judgment part 355, the angle correction part 356 and the frequency changer 357 may be formed of circuits (an existence detection circuit, an integrating circuit, an existence judgment circuit, an angle correction circuit and a frequency change circuit).

The separate judgment part 355a of the existence judgment part 355 supplies the overall judgment part 355b with a judgment signal representing that a moving object MO exists in the detection area when the absolute value of an integrated angle obtained from the integrating part 354 is larger than that of a first threshold value. In the third embodiment, if the integrated angle is larger than the first threshold value, for example, a High signal is supplied to the overall judgment part 355b, and otherwise a Low signal is supplied to the overall judgment part 355b.

The overall judgment part 355b controls the frequency changer 357 so as to set the first frequency $f_1$ to, for example, either of frequencies $f_{11}$ and $f_{12}$. The judgment part 355b then supplies the alarm 36 with an existence signal representing that a moving object MO exists in the detection area if receiving a High signal from the judgment part 355a in response to each of the frequencies $f_{11}$ and $f_{12}$. Concretely, the judgment part 355b sets the frequency $f_1$ of the oscillator 30 to the frequency $f_{11}$ (or $f_{12}$) via the changer 357, and monitors the output of the judgment part 355a. The judgment part 355b then suspends its operation for a predetermined standby time if receiving a high signal from the judgment part 355a in response to the frequency $f_{11}$. At this point, each of the existence detection part 350, the integrating part 354 and the separate judgment part 355a also suspends its operation. The standby time is set to the time such that incoming ultrasonic waves having the frequency $f_{11}$ vanishes. For example, the standby time is set to longer time than the maximum time between a point in time at which the oscillator 30 emits ultrasonic waves having the frequency $f_{11}$ to the detection area and a point in time at which the receiver 32 receives incoming ultrasonic waves corresponding to the ultrasonic waves from the detection area. Accordingly, it can be prevented that incoming ultrasonic waves corresponding to the frequency $f_{11}$ interferes with incoming ultrasonic waves corresponding to the subsequent frequency $f_{12}$. Also, the capacitors used for the filters 333 and 334 are fully discharged, and accordingly false operation caused by each remaining electric charge can be prevented. After the standby time, the judgment part 355b sets the frequency $f_1$ of the oscillator 30 to the frequency $f_{12}$ (or $f_{11}$) via the changer 357, and monitors the output of the judgment part 355a for a predetermined time limit. Meanwhile, if receiving a High signal from the judgment part 355a in response to the frequency $f_{12}$, the judgment part 355b supplies an existence signal to the alarm 36. The time limit is set based on the minimum value of each movement speed of each moving object MO.

The frequency changer 357 supplies the oscillator 30 with a control signal (DC voltage signal) for setting the frequency $f_1$ to either of the frequencies $f_{11}$ and $f_{12}$ in accordance with the control of the judgment part 355b.

Figure 10:
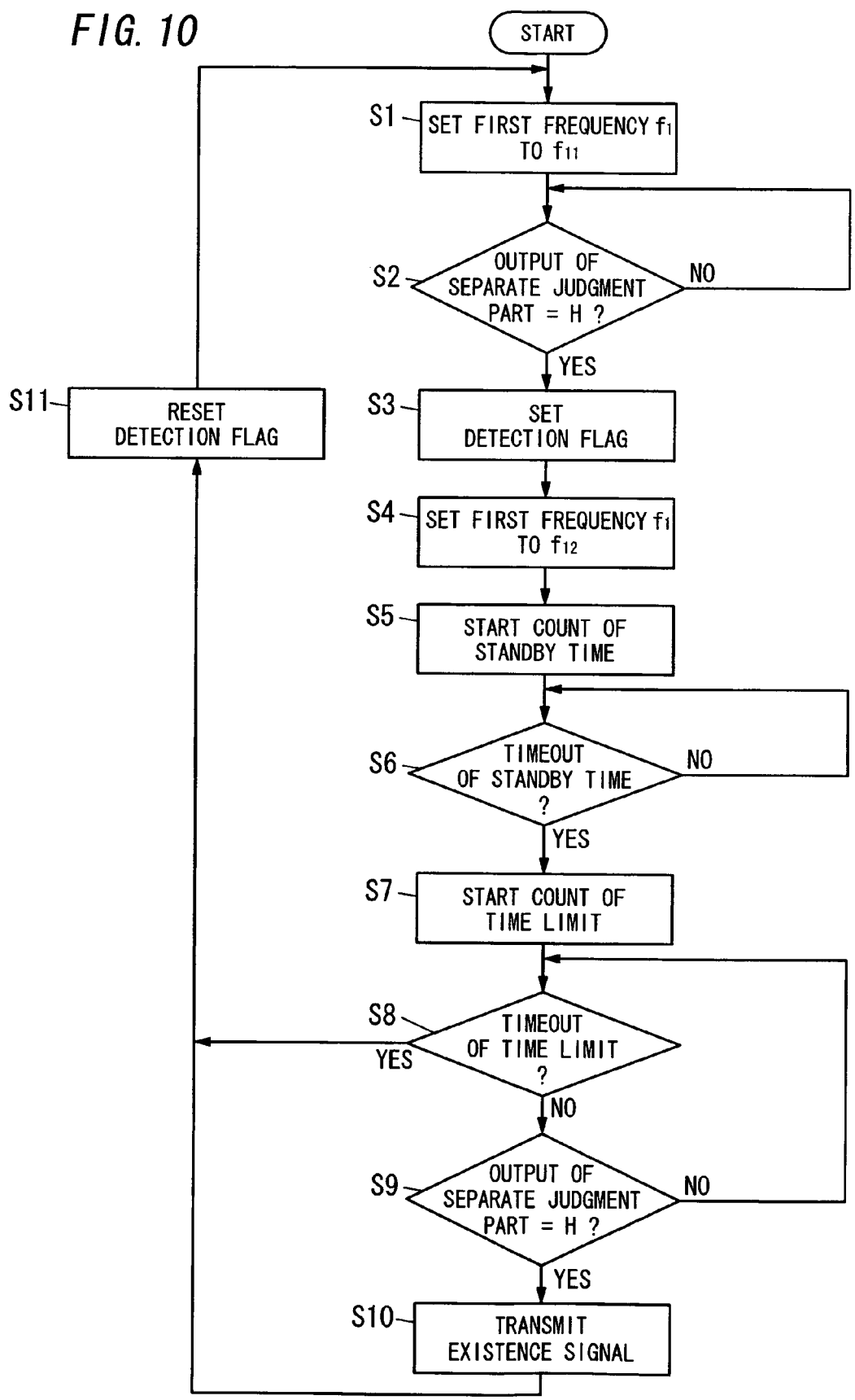
FIG. 10 is an operational flow chart of the third embodiment.

The operation of the third embodiment is now explained with reference to FIG. 10. If the moving object detection system is activated, the judgment part 355b sets the frequency $f_1$ of the oscillator 30 to either of the frequencies $f_{11}$ and $f_{12}$ (e.g., $f_{11}$) via the changer 357 at step S1. Subsequently, the judgment part 355b monitors the output of the judgment part 355a at step S2. The judgment part 355b sets a detection flag to e.g., "1" at step S3 if receiving a High signal from the judgment part 355a (YES at S2), and otherwise returns to S2 (NO at S2). After step S3, the judgment part 355b sets the frequency $f_1$ of the oscillator 30 to the different frequency (e.g., $f_{12}$) from that of the step S1 via the changer 357 at step S4. The judgment part 355b starts count of the standby time at steps S5 and 6, and the judgment part 355b and so on suspend their operations for the standby time. At this point, each parameter of the existence detection part 350, an integrated angle of the integrating part 354 and the like are initialized. After the standby time (YES at S6), the judgment part 355b starts count of the time limit at step S7, and judges whether or not the time limit runs out at step S8. During the time limit (NO at step 8), the judgment part 355b monitors the output of the judgment part 355a at step S9. The judgment part 355b supplies an existence signal to the alarm 36 if receiving a High signal from the judgment part 355a (YES at S9), and then advances to step S11. The judgment part 355b otherwise returns to step S8 (NO at S9). If the time limit runs out (YES at S8), the judgment part 355b advances to step S11. At step S11, the judgment part 355b sets the detection flag to e.g., "0" and returns to step S1. At this time, the judgment part 355b may change the frequency $f_1$ to the frequency $f_{11}$, but may maintain the frequency $f_{12}$.

In the third embodiment, an existence signal is supplied to the alarm 36 when the first frequency $f_1$ is sequentially set to either of, for example, the frequencies $f_{11}$ and $f_{12}$ and a judgment result representing that a moving object MO exists in the detection area is obtained in response to each of the frequencies $f_{11}$ and $f_{12}$. As a result, it can be prevented that false detection is made under the influence of small vibration, large energy waves from the detection area (sound waves of which sound pressure level is extremely high) or the like when a moving object MO does not exist in the detection area.

Figure 11:
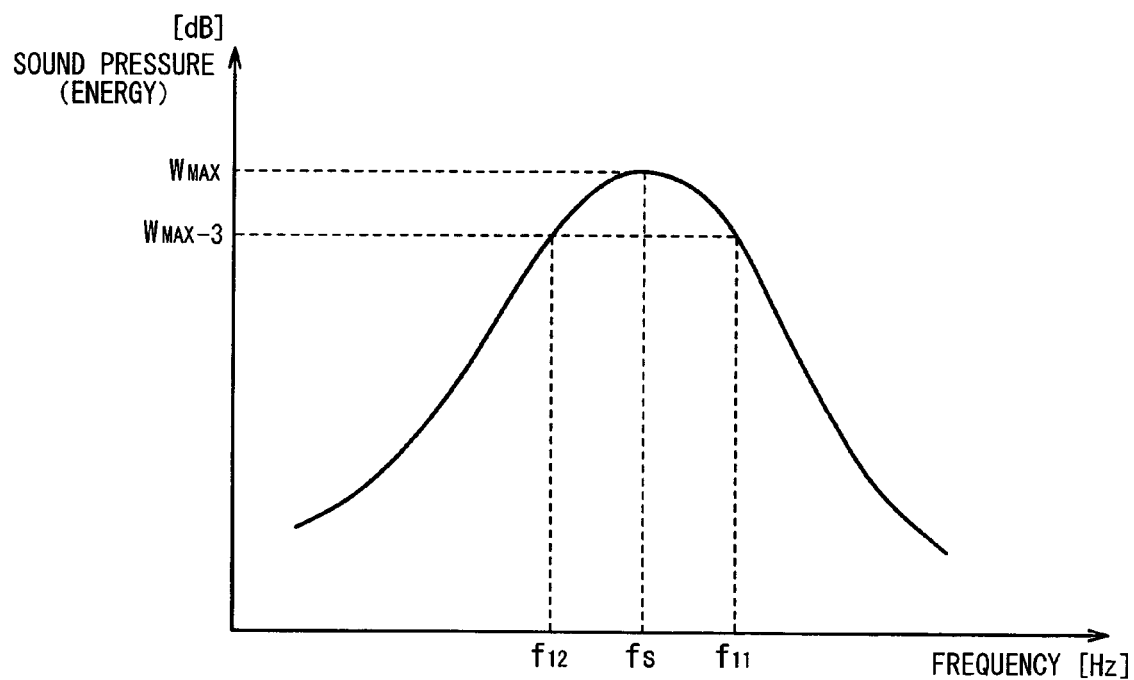
FIG. 11 is a frequency characteristic curve of an oscillator in a preferred embodiment.

In a preferred embodiment, as shown in FIG. 11, the oscillator 30 has a bell-shaped frequency characteristic of which vertex corresponds to the center frequency $f_s$ at which sound pressure of the ultrasonic waves becomes maximum ($W_{MAX}$). The oscillator 30 also generates the first reference signal of which first frequency $f_1$ is sequentially set to each of at least two sorts of frequencies $f_{11}$ and $f_{12}$ between which the frequency $f_s$ is located. In this instance, variation of sound pressures corresponding to the frequencies $f_{11}$ and $f_{12}$ is reduced, and accordingly variation in detectable movement distance can be reduced. In addition, sound pressures corresponding to at least two sorts of frequencies $f_{11}$ and $f_{12}$ may be substantially the same as each other. For example, if each of $f_{11}$ and $f_{12}$ corresponds to the sound pressure of $W_{MAX}$-3[dB], variation in detectable movement distance can be suitably reduced.

Although the present invention has been described with reference to certain preferred embodiments, numerous modifications and variations can be made by those skilled in the art without departing from the true spirit and scope of this invention.

The invention claimed is:

1. A moving object detection system, comprising:
    an oscillator configured to generate a first reference signal having a first frequency;
    a transmitter configured to emit energy waves having the first frequency to a detection area in accordance with the first reference signal;
    a receiver configured, when receiving incoming energy waves from the detection area, to generate an electric signal corresponding to the incoming energy waves;
    a phase shifter configured to shift the phase of the first reference signal to produce a second reference signal;
    a first detection part configured to mix the electric signal generated through the receiver with the first reference signal generated through the oscillator to produce a first detection signal, the first detection signal becoming a first Doppler shift signal when at least one second frequency different from the first frequency is obtained from the electric signal, the first Doppler shift signal having a frequency of the difference between the first frequency and the at least one second frequency;
    a second detection part configured to mix the electric signal generated through the receiver with the second reference signal produced through the phase shifter to produce a second detection signal, the second detection signal becoming a second Doppler shift signal when the at least one second frequency is obtained from the electric signal, the second Doppler shift signal having a frequency of the difference between the first frequency and the at least one second frequency and being different in phase from the first Doppler shift signal;
    an existence detection part configured, based on the first and second detection signals, to calculate a rotation angle of each transition factor that is obtained from the first and second detection signals and rotates around the origin of a two-dimensional coordinate system, said existence detection part being configured so that the rotation angle becomes smaller than 90 degrees;
    an integrating part configured to integrate each rotation angle calculated with the existence detection part to obtain an integrated angle; and
    an existence judgment part configured to judge whether or not a moving object approaching or leaving the receiver exists in the detection area based on the integrated angle and a threshold angle.

2. The moving object detection system of claim 1, further comprising an angle correction part configured: to compare a value obtained from the first and second detection signals with an allowable reference; and to adjust a value related to the rotation angle calculated with the existence detection part to a predetermined value if the value obtained from the detection signals does not meet the allowable reference,
    the allowable reference being set based on a value or a range obtained from each first and second detection signals when a moving object approaching or leaving the receiver exists in the detection area.

3. The moving object detection system of claim 2, wherein the angle correction part is configured: to judge whether or not a ratio of levels of the first and second detection signals is within an allowable range; and to set the corresponding rotation angle calculated with the existence detection part to zero or a predetermined minimum value if the ratio is not within the allowable range,
    the allowable range being set based on a variation range in a ratio of levels of each first and second detection signals obtained when a moving object approaching or leaving the receiver object exists in the detection area.

4. The moving object detection system of claim 3, wherein the angle correction part is configured to judge whether or not the ratio is within the allowable range after coordinate transformation by which the two-dimensional coordinate system is rotated by a specified angle around the origin.

5. The moving object detection system of claim 2, wherein the angle correction part is configured: to judge whether or not the magnitude of a vector from the origin to the transition factor is smaller than an allowable minimum magnitude; and to set the corresponding rotation angle calculated with the existence detection part to zero or a predetermined minimum value if the magnitude of the vector is smaller than the allowable minimum magnitude,
    the allowable minimum magnitude being set based on the minimum magnitude in a vector of each transition factor obtained when a moving object approaching or leaving the receiver exists in the detection area.

6. The moving object detection system of claim 2, wherein the angle correction part is configured: to judge whether or not a ratio of change in magnitude of a vector from the origin to the transition factor is within an allowable range; and to set the corresponding rotation angle calculated with the existence detection part to zero or a predetermined minimum value if the value of change is not within the allowable range, the allowable range being set based on minimum and maximum values of change in magnitude of a vector from the origin to each transition factor obtained when a moving object approaching or leaving the receiver exists in the detection area.

7. The moving object detection system of claim 2, wherein the angle correction part is configured: to judge whether or not the absolute value of the rotation angle calculated with the existence detection part is smaller than an allowable minimum angle; and to set the rotation angle to zero or a predetermined minimum value if the absolute value is smaller than the allowable minimum angle, the allowable minimum angle being set based on the minimum absolute value of each rotation angle obtained when a moving object approaching or leaving the receiver exists in the detection area.

8. The moving object detection system of claim 2, wherein the angle correction part is configured: to judge whether or not the absolute value of the rotation angle calculated with the existence detection part is larger than an allowable maximum angle; and to set the rotation angle to zero or a predetermined minimum value if the absolute value is larger than the allowable maximum angle, the allowable maximum angle being set based on the maximum absolute value of each rotation angle obtained when a moving object approaching or leaving the receiver exists in the detection area.

9. The moving object detection system of claim 2, wherein the angle correction part is configured: to judge whether or not a value of change of the rotation angle calculated with the existence detection part is larger than an allowable maximum value; and to set the rotation angle to zero or a predetermined minimum value if the value of change is larger than the allowable maximum value, the allowable maximum value being set based on the maximum value of change of each rotation angle obtained when a moving object approaching or leaving the receiver exists in the detection area.

10. The moving object detection system of claim 2, wherein the angle correction part is configured: to judge whether or not the absolute value of an integrated angle within a constant time obtained from the existence detection part is smaller than an allowable minimum integrated angle; and to set the integrated angle obtained by the integrating part to an initial value if the absolute value is smaller than the allowable minimum integrated angle, the allowable minimum integrated angle being set based on the minimum absolute value of each integrated angle within each constant time obtained when a moving object approaching or leaving the receiver exists in the detection area.

11. The moving object detection system of claim 2, wherein the angle correction part is configured: to judge whether or not the absolute value of an integrated angle within a constant time obtained from the existence detection part is smaller than an allowable minimum integrated angle; and to multiply the integrated angle obtained by the integrating part by a coefficient less than 1 if the absolute value is smaller than the allowable minimum integrated angle, the allowable minimum integrated angle being set based on the minimum absolute value of each integrated angle within each constant time obtained when a moving object approaching or leaving the receiver exists in the detection area.

12. The moving object detection system of claim 2, wherein the oscillator is a variable-frequency oscillator configured to vary the first frequency, the oscillator being configured to sequentially set the first frequency to each of at least two sorts of frequencies, wherein the existence judgment part is configured, when the judgment result that a moving object approaching or leaving the receiver exists in the detection area is obtained with respect to each of said at least two sorts of frequencies, to send out an existence signal representing that the moving object exists in the detection area.

13. The moving object detection system of claim 12, wherein the oscillator has a bell-shaped frequency characteristic of which vertex corresponds to the center frequency at which energy of the energy waves becomes maximum, the oscillator being configured to generate the first reference signal of which first frequency is sequentially set to each of said at least two sorts of frequencies between which the center frequency is located.

14. The moving object detection system of claim 13, wherein energies of energy waves corresponding to said at least two sorts of frequencies are substantially the same as each other.

15. The moving object detection system of claim 12, wherein the existence judgment part is configured to stop judging whether or not a moving object approaching or leaving the receiver exists in the detection area, during a predetermined standby time after the first frequency is set to any of said at least two sorts of frequencies.

16. The moving object detection system of claim 15, wherein the standby time is set to a longer time than the maximum time of each time between a point in time at which the transmitter emits said energy waves and a point in time at which the receiver receives incoming energy waves corresponding to the energy waves from the detection area.

17. The moving object detection system of claim 12, wherein at least the existence judgment part is configured to return to an initial state, after the first frequency is set to any of said at least two sorts of frequencies, if the judgment result that a moving object approaching or leaving the receiver exists in the detection area is not obtained with respect to the set frequency for a predetermined time limit.

* * * * *